(12) United States Patent
Jammer et al.

(10) Patent No.: US 10,000,663 B1
(45) Date of Patent: Jun. 19, 2018

(54) PROTECTIVE FLOWABLE OR SPREADABLE COMPOSITION, ARTICLES OF MANUFACTURE, AN APPARATUS FOR MANUFACTURE AND A PROCESS FOR MANUFACTURE THEREOF

(71) Applicant: L-M-J NATION SECURITY LLC, Wilmington, DE (US)

(72) Inventors: Daniel Jammer, Herzliyya (IL); Joseph Labock, Bat Yam (IL)

(*) Notice: Subject to any disclaimer, the term of this patent is extended or adjusted under 35 U.S.C. 154(b) by 414 days.

(21) Appl. No.: 14/534,338

(22) Filed: Nov. 6, 2014

Related U.S. Application Data

(63) Continuation-in-part of application No. PCT/IB2013/054397, filed on May 28, 2013.

(60) Provisional application No. 61/900,704, filed on Nov. 6, 2013, provisional application No. 61/652,278, filed on May 28, 2012, provisional application No. 61/652,281, filed on May 28, 2012.

(51) Int. Cl.
  *C09D 183/00* (2006.01)
  *C09D 101/28* (2006.01)
  *C09D 179/04* (2006.01)

(52) U.S. Cl.
  CPC ......... *C09D 183/00* (2013.01); *C09D 101/28* (2013.01); *C09D 179/04* (2013.01)

(58) Field of Classification Search
  CPC .......... C09K 21/14; C09D 5/185; B32B 27/00
  USPC .......... 428/212, 220, 215, 446, 451
  See application file for complete search history.

(56) References Cited

U.S. PATENT DOCUMENTS

| 3,607,600 A | * | 9/1971 | Schreter ............ B29C 70/08 156/245 |
| 3,707,385 A | | 12/1972 | Kraemer |
| 4,013,599 A | | 3/1977 | Strauss et al. |
| 4,071,946 A | | 2/1978 | Nilsson |
| 4,387,142 A | | 6/1983 | Lindholm et al. |
| 4,879,320 A | | 11/1989 | Hastings |
| 5,532,292 A | * | 7/1996 | Wainwright ............ C08K 7/10 252/606 |
| 5,723,515 A | * | 3/1998 | Gottfried ............... C09K 21/14 428/921 |
| 6,887,563 B2 | * | 5/2005 | Frank ..................... C04B 28/26 428/312.6 |
| 7,638,572 B2 | | 12/2009 | Horley et al. |

(Continued)

FOREIGN PATENT DOCUMENTS

| EP | 0568354 A1 | 11/1993 |
| WO | 9402545 A1 | 2/1994 |
| WO | 2012076905 A1 | 6/2012 |

OTHER PUBLICATIONS

PCT Search Report for related PCT Application No. PCT/IB2012/052662, dated Oct. 5, 2012.

*Primary Examiner* — Lawrence Ferguson
(74) *Attorney, Agent, or Firm* — Graeser Associates International Inc; Dvorah Graeser

(57) ABSTRACT

A protective flowable or spreadable composition. The protective composition optionally and preferably features a base material according to various embodiments and aerogel, dispersed in an acrylic dispersion. Preferably the protective composition further comprises one or more of chopped glass fibers and titanium dioxide. Water or an aqueous solution is preferably added to determine the degree of viscosity, for example to apply the composition in flowable form (paint, sprayable material, coating and so forth) or in spreadable form.

42 Claims, 2 Drawing Sheets

(56) References Cited

U.S. PATENT DOCUMENTS

| | | |
|---|---|---|
| 2004/0035318 A1 | 2/2004 | Gang |
| 2007/0108426 A1 | 5/2007 | Labock |
| 2009/0036561 A1 | 2/2009 | Nygren |
| 2009/0215926 A1 | 8/2009 | Kozlowski et al. |
| 2009/0275695 A1 | 11/2009 | Shen et al. |
| 2010/0168326 A1 | 7/2010 | Scholz et al. |
| 2010/0179281 A1 | 7/2010 | Nilsen |
| 2010/0223878 A1 | 9/2010 | Lipka et al. |

\* cited by examiner

PROTECTIVE FLOWABLE OR SPREADABLE COMPOSITION, ARTICLES OF MANUFACTURE, AN APPARATUS FOR MANUFACTURE AND A PROCESS FOR MANUFACTURE THEREOF

FIELD OF THE INVENTION

The present invention relates generally to a protective flowable or spreadable composition, articles of manufacture, an apparatus for manufacture and a process for manufacture thereof, and more specifically to fire resistant and/or thermal insulating paint featuring a combination of chemical and physical components.

BACKGROUND OF THE INVENTION

Many modern materials have important and desirable properties, yet may burn easily and may also give off toxic fumes when burning. Hence, much work is being done to find materials that are resistant to heat and flames, or that are otherwise "fire safe". The effort, in the market place as well in labs, is to find effective low-level additives to further reduce ignitability, or the heat release rate. Current solutions feature different kinds of coating or insertion of additives to organic and non-organic polymers. However, neither method by itself is adequate.

U.S. Pat. No. 7,638,572 to Horley et al teaches a fire retardant coating that features a film forming polymer, an inorganic fire retardant material such as huntite, hydromagnesite, aluminum trihydroxide or magnesium hydroxide, and a metal stannate or metal hydroxyl stannate. However the composition relies on a simple coating which provides limited fire retardant ability.

SUMMARY OF THE INVENTION

The present invention relates, in at least some embodiments, to a protective flowable or spreadable composition. The protective composition optionally and preferably features a base material according to various embodiments and aerogel, dispersed in an acrylic dispersion. Preferably the protective composition further comprises one or more of chopped glass fibers and titanium dioxide. Water or an aqueous solution is preferably added to determine the degree of viscosity, for example to apply the composition in flowable form (paint, sprayable material, coating and so forth) or in spreadable form.

By "protective composition" it is meant that the composition protects against one or more of heat transfer, sound transfer, water transfer (ie—by providing water resistance) and formation of condensation.

The composition is optionally suitable for an indoor surface or for an outdoor surface in at least some embodiments.

By "outdoor" it is meant that the surface is exposed to one or more of precipitation, sunlight, wind and severe weather. The term "severe weather" includes, without limitation, storms, thunderstorms, lightning storms, hurricanes, tornadoes, floods, snow, ice storms and hail.

By "indoor" it is meant that the surface is not exposed to one or more of precipitation, direct sunlight, wind or severe weather. Instead, the surface is at least partially contained within an enclosure and more preferably is at least protected by a roof.

By "fire resistant" or "fire retardant" it is also meant heat resistant or heat retardant; the terms are used interchangeably herein.

According to at least some embodiments of the present invention, there is provided a protective composition comprising a water or oil based emulsion or dispersion, a base material, wherein said base material further comprises a blowing agent and a foaming agent, wherein said foaming agent is present in an amount of 10 to 30 wt/% over the weight of said base material and wherein said foaming agent comprises ammonium phosphate, and wherein said blowing agent comprises melamine; a flame spread reduction material, wherein said flame spread reduction material comprises sodium silicate (Na2SiO3); an oxygen reduction agent wherein said oxygen reduction agent comprises urea formaldehyde, a thermal transmission reduction agent comprising zirconium oxide and a plurality of refractory fibers wherein said fibers comprise physical fibers comprising titanium oxide (TiO2), the composition further comprising a charring agent, said charring agent comprising dipentaerythritol (DPE); a mechanical enhancer, said mechanical enhancer comprising a ceramic oxide; a stabilizer, said stabilizer comprising one or both of paraffin or erythritol; further comprising an elasticity agent, wherein said elasticity agent comprises one or more of vermiculite, perlite elastomerics, and acrylics; and an aerogel.

Optionally the composition further comprises chopped glass fibers.

Optionally the composition further comprises additional titanium dioxide.

Optionally said acrylic dispersion has a viscosity of 100-2500 mPa, the composition further comprising sufficient water or aqueous solution to provide a flowable composition.

Optionally said acrylic dispersion has a viscosity of 100-2500 mPa, the composition further comprising sufficient water or aqueous solution to provide a spreadable composition.

Optionally said water or oil based emulsion or dispersion comprises an epoxy water based emulsion or waterborne epoxy paint.

Optionally a particle size of said aerogel is from 0.01 mm to 10 mm. Optionally said particle size is from 0.1 mm to 2 mm.

Optionally said aerogel is present in an amount of from 0.1% to 20% wt/wt over the weight of the total composition.

Optionally said aerogel is present in an amount of from 1% to 15%.

Optionally said acrylic dispersion is present in an amount of from 10% to 85% wt/wt over the weight of the total composition.

Optionally said acrylic dispersion is present in an amount of from 40% to 75%.

Optionally said acrylic dispersion comprises a plurality of acrylic dispersions. Optionally the composition further comprises alumina trihydrate.

Optionally said charring agent further comprises one or more of chlorinated paraffin, pentaerythritol, polyurethane, resorcinol, inositol, polyalcohols, sorbitol, or dextrin, or a combination thereof.

Optionally said blowing agent further comprises one or more of urea, dicyandiamide, guanidine, or glycine, or a combination thereof.

Optionally said base material further comprises a binding agent.

Optionally said binding agent comprises calcium carbonate or butoxyethoxy ethanol.

Optionally said base material further comprises a solvent.

Optionally said solvent comprises water, oil, toluene, or propylene glycol.

Optionally said base material further comprises a pigment.

Optionally said pigment comprises one or more of titanium oxide, lamp black or oxalates, or a combination thereof.

Optionally said flame spread reduction material further comprises one or more of ammonium orthophosphate, an aluminum oxide, silicon dioxide, ferric oxide, sodium oxide, beryllium oxide (BeO), manganese oxide (MNO), tantalum oxide (TaO2), calcium silicate (Ca2SiO4), antimony oxide or potassium metaphosphate.

Optionally said aluminum oxide comprises aluminum oxide trihydrate (Al2O3.3H2O).

Optionally said fibers have a size of from 1 micron to 100 millimeter.

Optionally said fibers have a size of from 10 microns to 10 millimeter.

Optionally said fibers have a size of from 100 microns to 1 millimeter.

Optionally the base material is present in an amount of 20 to 60 percent of the total weight of the composition.

Optionally the flame spread reduction material is present in an amount of 2% to 12%.

Optionally the oxygen reduction agent is present in an amount of 1% to 5%.

Optionally the thermal transmission reduction agent is present in an amount of 2% to 6%.

Optionally the refractory fibers are present in an amount of 8% to 18%.

Optionally said stabilizer is present in an amount of 6% to 12%.

Optionally said mechanical enhancer comprises one or more of calcium carbonate (CaCO3), calcium silicate, and sodium silicate.

Optionally said mechanical enhancer mechanical enhancer is present in an amount of 1% to 4%.

Optionally said elasticity agent is present in an amount of up to 20%.

Optionally the composition further comprises a water-resistance agent and an efflorescence reduction agent. Optionally said water-resistance agent and said efflorescence reduction agent are the same agent and wherein said combined agent is selected from the group consisting of carboxymethyl cellulose, ethyl hydroxyethyl cellulose ammonium polyphosphate (NH4H2PO4), melamine-formaldehyde coatings, acrylics, silicones, diethylene glycol, and monoethyletheracetate. Optionally said combined agent is present in an amount of 4% to 8%.

Optionally the composition further comprises a lead composition.

Optionally said lead composition comprises a lead powder.

Optionally said lead powder is a mixture of lead and a lead oxide.

Optionally said lead composition further comprises a binder selected from the group consisting of a polymer, water glass, an emulsion of a plastic, an aqueous binder or polyvinylalcohol, such that the powder forms a solid composition.

Optionally said polymer comprises polytetrafluoroethylene (PTFE) or a poly saccharide.

Optionally said composition has one or more of the following properties: fire resistance up to 1400° C.; low thermal conductivity which is lower than 50 mW/mK; low heat capacity; excellent adhesion; sound transmission reduction; and room temperature drying.

Optionally said low thermal conductivity is lower than 40 mW/mK.

Optionally said low thermal conductivity is lower than 30 mW/mK.

Optionally said low thermal conductivity is lower than 20 mW/mK.

Optionally said low thermal conductivity is lower than 10 mW/mK.

Optionally said base material is present in an amount of 1-20 wt/% over the weight of the composition.

Optionally said base material is present in an amount of 1-10 wt/%.

According to at least some embodiments there is provided a structure or physical object, comprising a layer of said protective composition as described herein.

Optionally said composition is applied in a thickness in a range of from 1 mm to 10 mm.

Optionally said composition is applied in a thickness in a range of from 2 mm to 5 mm.

The present invention, in various embodiments as described herein, is preferably applied to a physical structure so as to form a structure comprising a one or more layers of composite material which integrate to provide predetermined load-behavior characteristics such as lower peak heat release rates, lower heat released per unit time, higher temperature gradient, low flame spread, high ignition delay, low peak heat release, low total heat release, high thermal stability, heat sink effect, a reduced amount of smoke and heat reflective property.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

Figure 1:
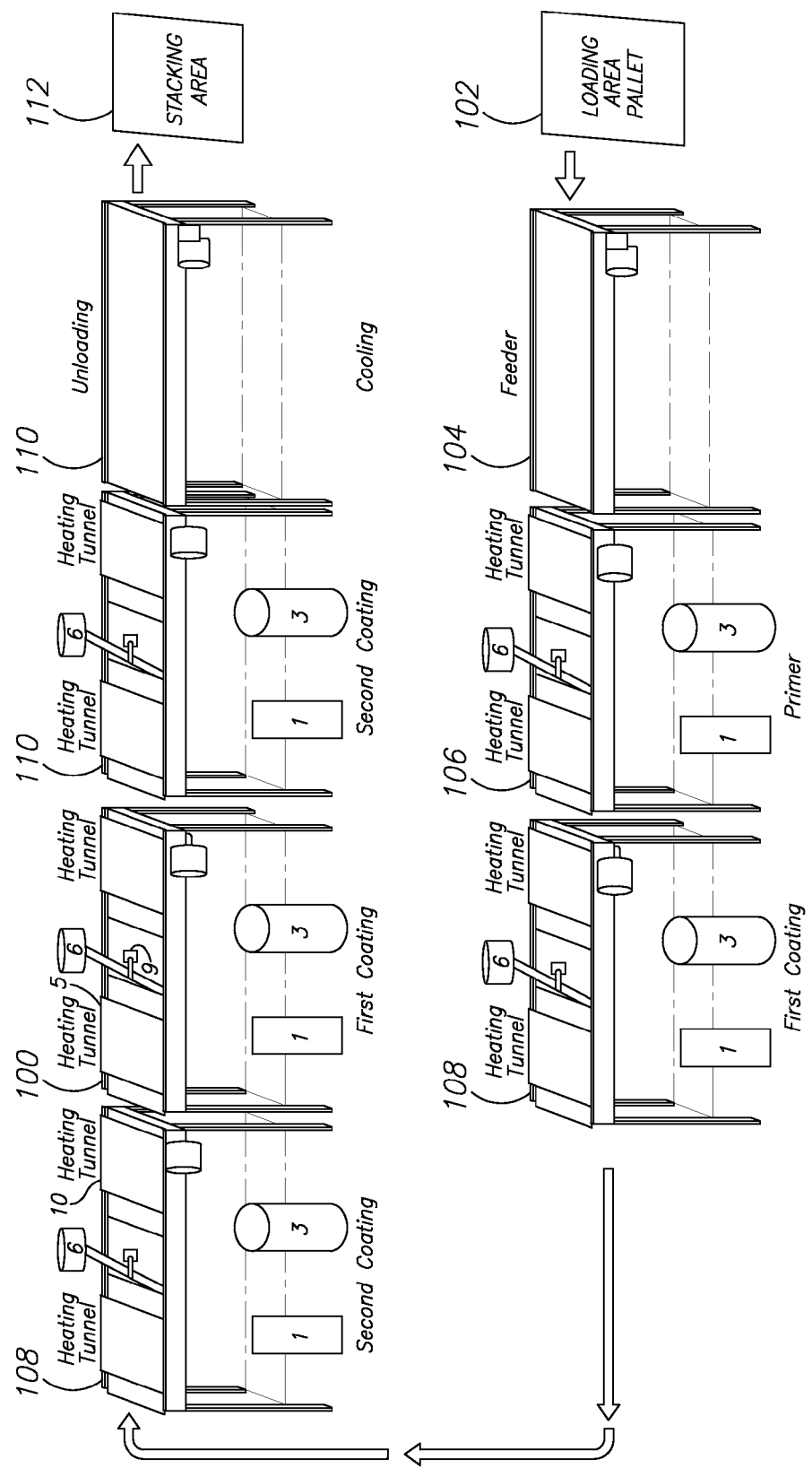
Figure 2:
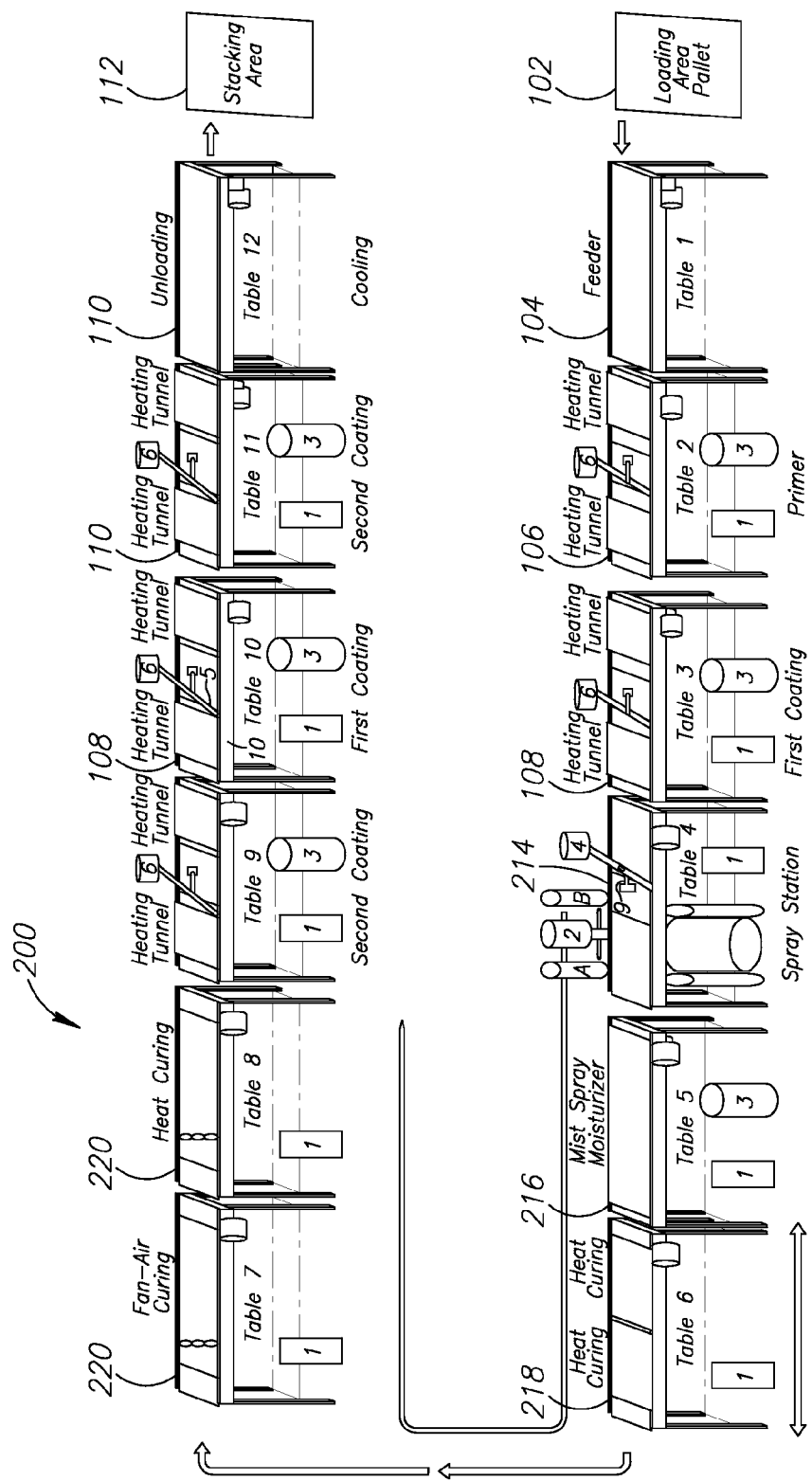

FIG. 1 shows an exemplary embodiment in which the apparatus operates on material that is not silicone-coated or that is already silicone-coated before the process of application of the coatings according to various embodiments of the present invention starts; and FIG. 2 shows an exemplary embodiment in which the apparatus performs silicone-coating of the material as an integral part of the coating process.

DETAILED DESCRIPTION OF THE INVENTION

The present invention relates, in at least some embodiments, to a protective flowable or spreadable composition. The protective composition optionally and preferably features a base material according to various embodiments and aerogel, dispersed in an acrylic dispersion. Preferably the protective composition further comprises one or more of chopped glass fibers and titanium dioxide. Water or an aqueous solution is preferably added to determine the degree of viscosity, for example to apply the composition in flowable form (paint, sprayable material, coating and so forth) or in spreadable form.

As described herein, there is provided a protective composition according to various embodiments, which preferably further comprises one or more ingredients suitable for outdoor exposure. Such ingredients may optionally comprise a water-resistance agent and an efflorescence reduction agent, which may optionally be the same agent. When combined the agent is optionally and preferably selected from the group consisting of carboxymethyl cellulose, ethyl hydroxyethyl cellulose, ammonium polyphosphate (NH4H2PO4), melamine-formaldehyde coatings, and other low solubility coatings and acrylics, silicones, diethylene glycol, and monoethyletheracetate. The water-resistance agent is optionally and preferably present in an amount of 4% to 8%.

Other non-limiting examples of such ingredients include biocidal agents, particularly those against moss, algae, lichen, mold and fungi, and other microorganisms that thrive in a moist environment. Such biocidal agents may optionally comprise elementary silver, silver salts, chlorinated materials and so forth. The composition may optionally be in the form of a coating. The coating may optionally be in the form of a paint, in which case the composition preferably further comprises one or more pigments and/or dyes suitable for outdoor use. Examples for pigments are titanium dioxide, iron oxide, magnesium oxide, zinc chromate, carbon black and barium sulphate. Dyes include, for example, para red, thioindigo, antrachinon, phthalocyanine blue and azo dyes.

The pigment or dye may further optionally compromise a pigment extender, to improve coverage afforded by the paint. The pigment extender may optionally include for example one or more of microcrystalline silica, nepheline syenite and/or metal fluoride; the metal fluoride may optionally include a silica coated metal fluoride. The composition may optionally further comprise a latex base, such as a vinyl-acrylic, vinyl acetate-ethylene or vinyl-acetate emulsion for example; the latex base may also optionally comprise a polymer having interpolymerized units that comprise units derived from styrene, methyl styrene, vinyl, or combinations thereof and units derived from one or more acrylates, methacrylates, acrylonitrile, or combinations thereof.

Alternatively or additionally, the composition may optionally further comprise an enamel base, non-limiting examples of which include a chlorinated alkyd enamel base (for example from Sherwin Williams, USA) or a resin enamel base.

Also additionally or alternatively, the composition may optionally further comprise a urethane base, for example in an aliphatic urethane base (for example from Sherwin Williams, USA), preferably used as an overcoating layer to a paint layer.

The composition may also optionally be used to impregnate a material that is to be exposed to the outdoors, in addition to or in place of its use as a coating.

The outdoor surface may optionally comprise, without limitation, one or more of a wall or roof of a building or other enclosure (whether partial or complete); a road surface or other surface on which vehicles or pedestrians travel; or an outer surface of a vehicle, including without limitation wheeled vehicles, flying vehicles and marine vehicles.

As described herein, there is provided a protective composition according to various embodiments, which preferably further comprises one or more ingredients suitable for indoor exposure. Optionally and more preferably, the composition features low or no amounts of volatile organic compounds (VOCs).

The composition may optionally be in the form of a coating. The coating may optionally be in the form of a paint, in which case the composition preferably further comprises one or more pigments and/or dyes suitable for indoor use. Examples for pigments are titanium dioxide, iron oxide, magnesium oxide, zinc chromate, carbon black and barium sulphate. Dyes include, for example, para red, thioindigo, antrachinon, phthalocyanine blue and azo dyes.

The pigment or dye may further optionally compromise a pigment extender, to improve coverage afforded by the paint. The pigment extender may optionally include for example one or more of microcrystalline silica, nepheline syenite and/or metal fluoride; the metal fluoride may optionally include a silica coated metal fluoride. As a paint, the composition may optionally feature one or more ingredients for UV light curing and/or may optionally be in the form of a dry powder coating. The composition may also optionally feature an aqueous base and/or a clay base that is suspended in water.

The composition may optionally further comprise a latex base, such as an acrylic, vinyl-acrylic, vinyl acetate-ethylene or vinyl-acetate emulsion for example; the latex base may also optionally comprise a polymer having interpolymerized units that comprise units derived from styrene, methyl styrene, vinyl, or combinations thereof and units derived from one or more acrylates, methacrylates, acrylonitrile, or combinations thereof. The latex may also optionally feature one or more natural oils. The composition may also optionally be used to impregnate a material that is contained indoors, in addition to or in place of its use as a coating.

The indoor surface may optionally comprise, without limitation, one or more of an inner wall, within a building or other enclosure (whether partial or complete), including without limitation the underside of a roof; or an inner surface of a vehicle (ie—a surface contained within the vehicle), including without limitation wheeled vehicles, flying vehicles and marine vehicles.

According to at least some embodiments, the inorganic fibers may optionally comprise silica or PVA (polyvinyl alcohol), or a combination thereof. The inorganic fibers may also optionally further comprise metals or other additives, for example for strengthening.

The inorganic fibers may optionally be provided in the form of a nonwoven fabric, which is optionally and preferably prepared through electrospinning US Published Patent Application No. 20110274927 to Kawabe et al provides non-limiting examples of such fibers and of electrospinning methods for preparing the nonwoven fabric.

An aerogel contains a gaseous phase, such as air, in place of a liquid phase. An aerogel is derived from a wet gel in a process that replaces the entrained liquid phase with air. If the gel is formed from a water phase, the resulting semi-solid is called a hydrogel, and the water is exchanged with organic solvent prior to drying. If the gel is formed within an alcohol phase, the resulting semi-solid is called an alcogel, and can be dried directly.

Drying may optionally be performed according to a supercritical process, in which the temperature and pressure of the solvent phase inside of the gel structure are both increased beyond the critical point. This "supercritical" extraction condition lowers the surface tension between the liquid and the solid pore surfaces so that depressurization of the system at temperatures above the critical temperature leaves the pore structure filled with gas.

Aerogels as described herein optionally and preferably comprise silicas and silicate materials. Optionally and more preferably, the silicate material comprises silicon alkoxides, such as silicon ethoxide derivatives, non-limiting examples of which include tetraethylorthosilicate (TEOS) and polydiethylsilicate (PDEOS).

Non-limiting examples of suitable solvents include alcohols and supercritical carbon dioxide.

The surface of aerogels may optionally be modified with: silane coupling agents (alkyl, amine, sulfhydryl, carboxyl, formyl); enzymes, chelating agents and so forth.

The aerogel may optionally be provided in the form of a blanket or sheet, for example in combination with the previously described nonwoven fabric. Non-limiting examples of aerogel products which are suitable for use with compositions of the present invention include Thermablok (Thermablok Inc, Tampa, Fla., USA) and Pyrogel XT (ThermaXX Jackets, LLC., West Haven, Conn., USA). Other non-limiting, illustrative examples of aerogels and methods of preparing such may be found in US Patent Application No. 20080311398 to Bauer et al and in US Patent Application No. 20110056408 to Schaumburg et al, hereby incorporated by reference as if fully set forth herein.

The aerogel may also optionally be added to composition in a "wet" or partially solvated form.

Whether added in a wet or dry form, the insulating properties of the aerogel may optionally be used in combination with the fire resistant compositions described herein to form insulating and fire resistant materials. Optionally the aerogel is combined with carbon or carbon based materials for additional insulation against infrared heat. A non-limiting example for such insulation would be to insulate windows, even for example for insulation filled glazings.

According to at least some embodiments, the fire resistant composition comprises both an aerogel and inorganic fibers, according to the various options described herein for each of these components.

The present invention will be more fully understood from the following detailed description of the preferred embodiments thereof, taken together with the drawings.

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

In the following detailed description, numerous specific details are set forth in order to provide a thorough understanding of some embodiments of the invention.

However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" as used herein include, for example, "multiple" or "two or more". For example, "a plurality of items" includes two or more items.

Example 1—Application to Wood

A fire-retardant coating material was prepared that included a fluid intumescent material (a non-limiting example of the base). The fluid intumescent material included a foaming agent; a blowing agent gas source selected from the group consisting of melamine, urea, dicyandiamide, guanidine and glycine; a charring agent, a film-forming binder, a solvent and, in some cases, a pigment or filler. Half a gallon of the intumescent material was mixed with 8 ounces of refractory fibers, which in this non-limiting example comprised 3 ounces of milled fiber and 5 ounces of short strand fibers. The fibers comprised aluminum oxide (about 50% of the total fibers weight per weight), silicon dioxide (about 50%), ferric oxide (about 0.15%), titanium dioxide (about 0.15%), potassium oxide (about 0.15%), sodium oxide (about 0.2%) and zirconium oxide (about 0.2%). This combination was mixed with 16 ounces of granite powder and applied as a coating to one side of a wood sample of the size of 20×20 centimeters.

Next a layer of a one component, water-based, caulking grade, general purpose fire resistant sealant in the form of silicone resin was applied to the coated wood.

After curing a layer of the fire resistant composition according to at least some embodiments of the present invention was applied.

The coating of the fire resistant composition was applied to a thickness of 0.250 inches in this non-limiting example; however, optionally the composition is applied in a thickness in a range of from about 0.050 inch to about 0.50 inch.

A propane torch, having a temperature of 2600 F, was applied to the surface of the wood sample covered with the composition for one (1) hour. The inner layer was shown to be unaffected; the outer layer swelled and bubbled, thereby forming a protective layer that protects the inner layer.

During this heating process, it was possible to place a hand behind the material which had a cool temperature to the touch, such that no heat or flames affected the other side of the wood. It was determined that the wood was able to resist the fire and the heat for the time of the test and was sufficiently insulated from the heat to protect both the wood material and anything behind the wood material as a barrier.

Based upon various tests with wood, it has been determined that when heat is applied to the coated wood at a temperature in the range of from 1200 to 4000°, the coating composition swells to 5 to 12 times the original thickness of the coating, while the wood remains protected. Similar results, in terms of the maximum temperature range, were found for fabric, wood and cardboard, as described below.

Example 2—Coated Fabric

The same composition of Example 1 was applied to one side of a fabric article, featuring two pieces of heavy duty plain woven fabric attached together with fire related silicone sealant in which the coating was applied at the same thickness as for the wood in Example 1. The fabric tested was a Pyroblanket (ADL Insulflex Inc), although optionally canvas, fiberglass (optionally coated), Kevlar, mineral impregnated or coated fabric, aluminum and other sheet metal fabrics may be used, additionally or alternatively. The silicone sealant tested was Metacaulk 1000 (Rectorseal).

A propane torch, at a temperature of 1300 F, was applied to the coated fabric for 17 minutes. Again, while the coating bubbled and swelled, the fabric maintained its integrity and was cool to the touch on the side away from the flame. The coated fabric was found to withstand a similar temperature range as for wood in Example 1.

Example 3—Cardboard

The same composition of Example 1 was applied to one side of a piece of cardboard at the same thickness as for the wood in Example 1. A propane torch, at a temperature of 1300 F, was applied to the coated cardboard for 12 minutes. Again, while the coating bubbled and swelled, the fabric maintained its integrity and was cool to the touch on the side away from the flame. The coated fabric was found to withstand a similar temperature range as for wood in Example 1.

Example 4—Drywall

The same composition of Example 1 was applied to one side of a piece of drywall at the same thickness as for the wood in Example 1. A propane torch, at a temperature of 2600 F, was applied to the coated drywall for 90 minutes. Again, while the coating bubbled and swelled, the drywall maintained its integrity and was cool to the touch on the side away from the flame. The coated drywall was found to withstand a similar temperature range as for wood in Example 1.

Example 5—Fabric Case

A fabric case was made from plain-woven heavy-duty pieces of fabric, again attached with Fire Rated Silicone Sealant to form a case in a shape of a box in the size of 20×10×20 centimeters. Inside the box was placed Styrofoam in the size of 3×3×3 cube, a cell phone battery and two AA energizer batteries. The box was sealed and exposed to open flame produced by igniting gasoline in an open bath made out of metal in the size of 60×60 centimeters. The temperature of the flame was measured to be 640 C. After 15 minutes the objects were removed from the case. The materials that were placed inside the case were protected from the flames and the heat; no charring or heat or fire damage was observed, and the batteries were found to be fully functional.

Example 6—Machine for Applying Coating(s)

FIGS. 1 and 2 show different embodiments of machines according to various embodiments of the present invention for applying the coating(s) described above. FIG. 1 shows an exemplary embodiment in which the apparatus operates on material that is not silicone-coated or that is already silicone-coated before the process of application of the coatings according to various embodiments of the present invention starts. FIG. 2 shows an exemplary embodiment in which the apparatus performs silicone-coating of the material as an integral part of the coating process.

As shown in FIG. 1, a coating apparatus 100 features a loader 102 for receiving physical articles to be coated, which in turn provides the articles to a feeder 104. Primer is then applied at a priming table 106, which preferably features an electronic control unit 1 and a pressure tank 3 for holding the priming material. The priming material is applied to the article by a spray unit 6, which comprises a motor drive (not shown) for moving spray unit 6 over the surface to be sprayed. Optionally spray unit 6 features two spray heads 5, one of which optionally and preferably sprays material while the other of which preferably acts to cure the sprayed material. Priming table 106 also features two heating tunnels 10 for more even heating of the sprayed material, although optionally only one heating tunnel 10 may be provided.

After priming, the article optionally passes to at least one fire resistant base coating table 108 and optionally two such tables 108 as shown; more tables could optionally be implemented for multiple base coatings (not shown). Again, fire resistant base coating table 108 features similar components to priming table 106, for spraying the base coating on the article and for heating it.

After application of the base, the article passes to at least one fire resistant composition coating table 110 and optionally two such tables 110 as shown; more tables could optionally be implemented for multiple base coatings (not shown). Again, fire resistant composition coating table 110 features similar components to priming table 106, for spraying the base coating on the article and for heating it.

Next the article passes to a cooling table 112 and is then unloaded.

FIG. 2 shows an apparatus 200 which is another embodiment of an apparatus for applying coatings according to various embodiments of the present invention. Components with the same number as FIG. 1 have the same or similar function.

The process for operating apparatus 200 of FIG. 2 is very similar to that of FIG. 1, except that after the first base coating table 108, the article is preferably passed to a silicone coating table 214, for coating the initially coated article with a layer of silicone. Silicone coating table 214 features at least one silicone pump 2 and preferably two silicone pumps 2 (shown as A and B) for pumping silicone onto the article. The silicone is pumped from each silicone pump 2 to a spray gun 9 through a silicone gun applicator bridge 8. A motor drive 4 ensures that the spray gun 9 is moved evenly over the article that is being sprayed.

The article then moves to a moisturizing spray table 216 for applying moisture for steaming with heating, after which the article is cured on a curing table 218. The temperature for curing in this example was 60-70 C and also featured blown dry air; however, optionally curing may take place at a range of 40-90 C. Silicone coatings may for example take 16 minutes to cure; again optionally any of these coatings may be applied as a pre-formed layer. After that the article is moved to one or more air-curing (air-drying) tables 220, which direct a flow of blown air onto the article. The remaining tables and processes occur as for FIG. 1.

Example 7—Exemplary Formulations

This Example relates to exemplary, illustrative formulations as described herein.

Formula 1—Basic (Base)

1. foaming agent—mono-ammonium phosphate, (NH4)3PO4 (in powder form or granules), 20%
2. blowing agent gas source—melamine resin, 27%
3. film-forming binder—silicon resin, 25%
4. Efflorescence reduction agent—carboxymethyl cellulose, 5%
5. Mechanical enhancer components—ceramic oxides, 2%
6. Stabilizer and volatile organic (VOC) reduction components—erythritol and paraffin (optionally in equal amounts; also optionally only one of these two components may be present), 9%
7. Refractory fibers—titanium oxide, 10%
8. Thermal transmission reduction agents—zirconium dioxide (ZrO2), 5%
9. Oxygen reduction agent—urea formaldehyde, 2%
10. Flame spread reduction agent—sodium silicate (Na2SiO3), 9%
11. Elasticity agent—vermiculite, 10%
12. Fine mica powder—25%
13. Solvent—water, sufficient to produce a fluid consistency—example 30%

14. Pigment—TiO2, ZnO (alone or in combination), 20%
15. Charring agent—dipentaerythritol (DPE), 15%
16. Optionally siloxanes Formula 2—Base Plus Aerogel
1. foaming agent—mono-ammonium phosphate, (NH4)3PO4 (in powder form or granules), 20%
2. blowing agent gas source—melamine resin, 27%
3. film-forming binder—silicon resin, 25%
4. Efflorescence reduction agent—carboxymethyl cellulose, 5%
5. Mechanical enhancer components—ceramic oxides, 2%
6. Stabilizer and volatile organic (VOC) reduction components—erythritol and paraffin (optionally in equal amounts; also optionally only one of these two components may be present), 9%
7. Refractory fibers—titanium oxide, 10%
8. Thermal transmission reduction agents—zirconium dioxide (ZrO2), 5%
9. Oxygen reduction agent—urea formaldehyde, 2%
10. Flame spread reduction agent—sodium silicate (Na2SiO3), 9%
11. Elasticity agent—vermiculite, 10%
12. Fine mica powder—25%
13. Solvent—water, sufficient to produce a fluid consistency—example 30%
14. Pigment—TiO2, ZnO (alone or in combination), 20%
15. Charring agent—dipentaerythritol (DPE), 15%
16. Optionally siloxanes
17. Aerogel coated or impregnated with the above composition, or alternatively mixed with the above composition in the form of particles Formula 3—Plus Aerogel and Inorganic Fibers
1. foaming agent—mono-ammonium phosphate, (NH4)3PO4 (in powder form or granules), 20%
2. blowing agent gas source—melamine resin, 27%
3. film-forming binder—silicon resin, 25%
4. Efflorescence reduction agent—carboxymethyl cellulose, 5%
5. Mechanical enhancer components—ceramic oxides, 2%
6. Stabilizer and volatile organic (VOC) reduction components—erythritol and paraffin (optionally in equal amounts; also optionally only one of these two components may be present), 9%
7. Refractory fibers—titanium oxide, 10%
8. Thermal transmission reduction agents—zirconium dioxide (ZrO2), 5%
9. Oxygen reduction agent—urea formaldehyde, 2%
10. Flame spread reduction agent—sodium silicate (Na2SiO3), 9%
11. Elasticity agent—vermiculite, 10%
12. Fine mica powder—25%
13. Solvent—water, sufficient to produce a fluid consistency—example 30%
14. Pigment—TiO2, ZnO (alone or in combination), 20%
15. Charring agent—dipentaerythritol (DPE), 15%
16. Optionally siloxanes
17. Nonwoven fabric coated or impregnated with aerogel, and then combined with the above composition, for example by being coated with the above composition.

Example 8—Additional Formulations

This Example relates to additional formulations for the inventive materials as described herein, as well as other additional but optional ingredients.

Acrylic dispersion 1 is miscible but insoluble in water and has a viscosity of 100-1500 mPa; for the present Example only and without wishing to be limited in any way, the material employed was WorleeCryl CH-X-2158 (Worlee-Chemi GmbH, Hamburg, Germany).

Acrylic dispersion 2 is miscible but insoluble in water and has a viscosity of 150-2500 mPa; for the present Example only and without wishing to be limited in any way, the material employed was WorleeCryl CH-X-2159 (Worlee-Chemi GmbH, Hamburg, Germany).

Both Acrylic dispersions 1 and 2 are high solid acrylic dispersions. It should be noted that optionally these compositions may be used without the further materials described herein and/or with other such materials.

Optionally in place of the acrylic dispersion, an epoxy material, such as an epoxy water based emulsion, may be used. One non-limiting example is EPI-REZ epoxy waterborne resin 3515-W-60 (Momentive Corporation) or any suitable waterborne acrylic paint.

Additive 1 is a special additive for the crosslinking of aqueous dyes and inks based upon carboxi-functional acrylic polymers, featuring an alkaline ZnO solution as 15% in water; for the present Example only and without wishing to be limited in any way, the material employed was Worlee-Add 8905 (Worlee-Chemi GmbH, Hamburg, Germany).

Additive 2 is optionally either flame retardant additive WorleeAdd FR 5000, which is a halogen free flame retardant based on encapsulated phosphoric compounds that is insoluble in water (Worlee-Chemi GmbH, Hamburg, Germany); or a flame retardant according to various embodiments of the present invention, for which the formulation was given in Example 2 above.

The exemplary, illustrative formulation described herein preferably comprises the above materials, plus the aerogel. For the purpose of this example, the aerogel material preferably comprises the Enova™ aerogel and features particles sized at 0.1 mm-0.7 mm or 0.1 mm-1.2 mm, according to the manufacturer (Cabot Corp, Boston, Mass., USA).

Optionally, the formulation comprises chopped glass fibers and titanium dioxide (the latter is preferably provided in paste form). The chopped glass fibers optionally comprises boro-silicate-aluminum-calcium glass with a sizing agent, for example as product FGCS 316 from Schwarzwalder Textil-Werke Heinrich Kautzmann GmbH, Schenkenzell Germany. The formulation is preferably maintained in a flowable form through the addition of water.

According to at least some embodiments, the formulation preferably features the below ingredients:

| Material | Weight percentage over the weight of the final formulation |
| --- | --- |
| Acrylic dispersion 1 (61% in water) | 48.20% |
| Acrylic dispersion 2 (61% in water) | 24.00% |
| Titanium dioxide paste (50% in water) | 1.40% |
| Chopped glass fibers (3 mm) | 3.30% |
| Additive 1 (15% in water) | 2.80% |
| Additive 2 | 9.40% |
| Aerogel | 9.40% |
| Water | 1.5% |

The formulation is optionally and preferably prepared as described below.

First, acrylic dispersions 1 and 2 are mixed together (optionally only one acrylic dispersion may be used). Next titanium dioxide paste and chopped glass fibers are added in portions to the mixture until a foamed mixture is obtained.

Preferably the foamed mixture has double the original volume. Also preferably, the temperature of the materials during this process does not exceed 40° C.

Next the first additive is added to the foamed mixture, preferably with low shear mixing. The second additive is then stirred in slowly. The aerogel is preferably then mixed in with low shear mixing. Water is added to adjust viscosity as necessary. Preferably, the temperature of the materials during this process does not exceed 35° C.

The resultant formulation has many excellent properties, particularly when additive 2 is prepared according to Example 2 above. Without wishing to be limited by a closed list, these properties include providing fire resistance up to 1400° C.; low thermal conductivity which is optionally lower than 50 mW/mK or 40 mW/mK (W/K is Watts per meter Kelvin), preferably lower than 30 mW/mK, more preferably lower than 20 mW/mK and most preferably lower than 10 mW/mK; low heat capacity; excellent adhesion; sound transmission reduction; extensive flexibility, elasticity and plasticity; and room temperature drying. Optionally and preferably, no additional dangerous solvents are needed, as the material is provided with an aqueous base.

It should be noted that by "lower than" it is meant that the measurement is not higher than the upper bound and is optionally at least any measurable lower bound.

Manual tests of the material were performed as follows. The above formulation was sprayed, coated or applied with a knife, according to the viscosity, onto a surface to be tested. One example of a tested surface is aluminum. Two surfaces tested were 5 mm and 50 mm thick. The formulation was applied in each of the three above formulation viscosities. Next, an open flame (a flame from a propane torch, at a temperature of 1300 F) was applied first to the coated side of each surface for the 5 mm thick aluminum material. The equivalent surface without any coating burned, while direct application of the flame to the coated side did not burn.

A calibrated hot plate was heated to 300 C and the non-coated side of the 50 mm thick material was placed against the plate. The coated side was sufficiently cool (about 45 C according to a digital thermometer) to allow a hand to be placed against it without burning.

Example 9—Applications of the Formulation of Example 8

The above formulations may optionally be applied in various ways. For example, if sufficient water is added, then the formulation may be in the form of a freely flowing liquid and may optionally be applied as a paint (ie—painted on with a brush, sprayed and so forth). Even as a paint, the material may optionally be coated, sprayed, layered on or otherwise layered onto an object with a thickness of 0.1 mm to 20 mm per application (multiple applications to the same object are possible).

With a lower amount of water added (and hence a higher viscosity), the formulation may optionally be in the form of a paste and so may be applied as for any other industrial paste (caulk gun, spatula application and so forth). However, according to various embodiments of the present invention, the material may optionally be applied directly to a surface, without first applying primer.

As noted previously, the formulations of Example 8 may optionally be used for thermal insulation, flame resistance and/or sound proofing, or any combination of the above. Some non-limiting applications include Industrial applications (Pipes and Reactors, Storage Tanks, Safe Touch Coatings, Oil and Gas); Transportation (Automotive, Container, Caravan, Yachts) or Construction (Building Insulation, cryogenic insulation and applications, HVAC (heating, ventilation and air conditioning) insulation). Typically 2-5 mm coating thicknesses are applied.

According to the type of aerogel selected, the formulations of Example 8 may also optionally be provided in a transparent or semi-transparent form, for example for insulation of glass and/or as a glass substitute and/or as a sandwich or layer with glass.

Safe touch coatings prevent individuals from becoming burned or injured due to accidental contact with a hot surface. The material may also optionally be used to prevent condensation on a surface, due to heat differences and transfer with the surrounding environment.

Different coating thicknesses may optionally be used for different applications. For example, a 2 mm coating is sufficient to reduce energy consumption by about 30%.

The references cited herein teach many principles that are applicable to the present invention. Therefore the full contents of these publications are incorporated by reference herein where appropriate for teachings of additional or alternative details, features and/or technical background.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims. Furthermore, any combinations of embodiments or sub-embodiments may optionally be made and are considered within the scope of the present invention.

What is claimed is:

1. A protective composition comprising a water or oil based dispersion or emulsion, wherein said water or oil based emulsion or dispersion comprises an acrylic dispersion and wherein said acrylic dispersion is present in an amount of from 10% to 85% wt/wt over the weight of the total composition, a base material, wherein said base material further comprises a blowing agent and a foaming agent, wherein said foaming agent is present in an amount of 10 to 30 wt/% over the weight of said base material and wherein said foaming agent comprises ammonium phosphate, and wherein said blowing agent comprises melamine; a flame spread reduction material, wherein said flame spread reduction material comprises sodium silicate ($Na_z SiO_3$); an oxygen reduction agent wherein said oxygen reduction agent comprises urea formaldehyde, a thermal transmission reduction agent comprising zirconium oxide and a plurality of refractory fibers wherein said fibers comprise physical fibers comprising titanium oxide ($TiO_2$), the composition further comprising a charring agent, said charring agent comprising dipentaerythritol (DPE); a mechanical enhancer, said mechanical enhancer comprising a ceramic oxide; a stabilizer, said stabilizer comprising one or both of paraffin or erythritol; further comprising an elasticity agent, wherein said elasticity agent comprises one or more of vermiculite, perlite elastomerics, and acrylics; and an aerogel; wherein said aerogel is present in an amount of from 0.1% to 20% wt/wt over the weight of the total composition, and wherein a particle size of said aerogel is from 0.01 mm to 10 mm and wherein said aerogel is mixed in last to the mixture of ingredients of the composition; wherein said acrylic dispersion has a viscosity of 100-2500 mPa, the composition further comprising water in an amount of from 1.5% to 30%; wherein said composition has one or more of the following properties: fire resistance up to 1400° C.; low thermal conductivity which is lower than 50 mW/mK; low heat capacity; excellent adhesion; sound transmission reduction; and room temperature drying.

2. The composition of claim 1, further comprising chopped glass fibers mixed into the composition.

3. The composition of claim 2, further comprising titanium dioxide.

4. The composition of claim 1, wherein said particle size is from 0.1 mm to 2 mm.

5. The composition of claim 1, wherein said aerogel is present in an amount of from 1% to 15%.

6. The composition of claim 1, wherein said acrylic dispersion is present in an amount of from 40% to 75%.

7. The composition of claim 6, wherein said acrylic dispersion comprises a plurality of acrylic dispersions.

8. The composition of claim 7, wherein said water or oil based emulsion or dispersion comprises an epoxy water based emulsion or a waterborne acrylic paint.

9. The composition of claim 1, further comprising alumina trihydrate.

10. The composition of claim 1, wherein said charring agent further comprises one or more of chlorinated paraffin, pentaerythritol, polyurethane, resorcinol, inositol, polyalcohols, sorbitol, or dextrin, or a combination thereof.

11. The composition of claim 1, wherein said blowing agent further comprises one or more of urea, dicyandiamide, guanidine, or glycine, or a combination thereof.

12. The composition of claim 1, wherein said base material further comprises a binding agent.

13. The composition of claim 12, wherein said binding agent comprises calcium carbonate or butoxyethoxy ethanol.

14. The composition of claim 1, wherein said base material further comprises a solvent, wherein said solvent comprises water, oil, toluene, or propylene glycol.

15. The composition of claim 1, wherein said base material further comprises a pigment.

16. The composition of claim 15, wherein said pigment comprises one or more of titanium oxide, lamp black or oxalates, or a combination thereof.

17. The composition of claim 1, wherein said flame spread reduction material further comprises one or more of ammonium orthophosphate, an aluminum oxide, silicon dioxide, ferric oxide, sodium oxide, beryllium oxide (BeO), manganese oxide (MNO), tantalum oxide ($TaO_2$), calcium silicate ($Ca_2SiO_4$), antimony oxide or potassium metaphosphate.

18. The composition of claim 17, wherein said aluminum oxide comprises aluminum oxide trihydrate ($Al_2O_3.3H_2O$).

19. The composition of claim 1, wherein said fibers have a size of from 1 micron to 100 millimeter.

20. The composition of claim 19, wherein said fibers have a size of from 10 microns to 10 millimeter.

21. The composition of claim 20, wherein said fibers have a size of from 100 microns to 1 millimeter.

22. The composition of claim 1, wherein the base material is present in an amount of 20 to 60 wt/percent over the weight of said base material.

23. The composition of claim 1, wherein the flame spread reduction material is present in an amount of 2% to 12% wt/percent over the weight of said base material.

24. The composition of claim 1, wherein the oxygen reduction agent is present in an amount of 1% to 5% wt/percent over the weight of said base material.

25. The composition of claim 1, wherein the thermal transmission reduction agent is present in an amount of 2% to 6% wt/percent over the weight of said base material.

26. The composition of claim 1, wherein the refractory fibers are present in an amount of 8% to 18% wt/percent over the weight of said base material.

27. The composition of claim 1, wherein said stabilizer is present in an amount of 6% to 12% wt/percent over the weight of said base material.

28. The composition of claim 1, wherein said mechanical enhancer comprises one or more of calcium carbonate ($CaCO_3$), calcium silicate, and sodium silicate.

29. The composition of claim 28, wherein said mechanical enhancer is present in an amount of 1% to 4% wt/percent over the weight of said base material.

30. The composition of claim 1, wherein said elasticity agent is present in an amount of up to 20% wt/percent over the weight of said base material.

31. The composition of claim 1, further comprising a water-resistance agent and an efflorescence reduction agent.

32. The composition of claim 31, wherein said water-resistance agent and said efflorescence reduction agent are the same agent and wherein said combined agent is selected from the group consisting of carboxymethyl cellulose, ethyl hydroxyethyl cellulose ammonium polyphosphate (NH4H2PO4), melamine-formaldehyde coatings, acrylics, silicones, diethylene glycol, and monoethyletheracetate.

33. The composition of claim 32, wherein said combined agent is present in an amount of 4% to 8% wt/percent over the weight of said base material.

34. The composition of claim 1, wherein said low thermal conductivity is lower than 40 mW/mK.

35. The composition of claim 34, wherein said low thermal conductivity is lower than 30 mW/mK.

36. The composition of claim 35, wherein said low thermal conductivity is lower than 20 mW/mK.

37. The composition of claim 36, wherein said low thermal conductivity is lower than 10 mW/mK.

38. The composition of claim 1, wherein said base material is present in an amount of 1-20 wt/% over the weight of the composition.

39. The composition of claim 38, wherein said base material is present in an amount of 1-10 wt/%.

40. A structure or physical object, comprising a layer of said protective composition of claim 1.

41. The structure or physical object of claim 40, wherein said composition is applied in a thickness in a range of from 1 mm to 10 mm.

42. The structure or physical object of claim 41, wherein said composition is applied in a thickness in a range of from 2 mm to 5 mm.

* * * * *